US007938387B2

(12) United States Patent
Fossati

(10) Patent No.: US 7,938,387 B2
(45) Date of Patent: May 10, 2011

(54) SPRINGING CONSTRUCTION FOR MAKING MATTRESSES AND THE LIKE

(76) Inventor: Valentino Fossati, Lissone (IT)

(*) Notice: Subject to any disclaimer, the term of this patent is extended or adjusted under 35 U.S.C. 154(b) by 969 days.

(21) Appl. No.: 11/827,763

(22) Filed: Jul. 13, 2007

(65) Prior Publication Data

US 2008/0023895 A1 Jan. 31, 2008

(30) Foreign Application Priority Data

Jul. 13, 2006 (IT) .............................. MI2006A1360

(51) Int. Cl.
*F16F 1/20* (2006.01)
(52) U.S. Cl. ......... 267/165; 267/142; 267/145; 267/164
(58) Field of Classification Search .................. 267/104, 267/165, 142, 145, 160, 164; 5/719, 718, 5/247, 255
See application file for complete search history.

(56) References Cited

U.S. PATENT DOCUMENTS

| 5,426,799 | A  | * | 6/1995  | Ottiger et al. ...................... 5/719 |
| 5,588,165 | A  | * | 12/1996 | Fromme ........................... 5/247 |
| 5,747,140 | A  | * | 5/1998  | Heerklotz ..................... 428/131 |
| 5,787,533 | A  | * | 8/1998  | Fromme ........................... 5/719 |
| 6,170,808 | B1 | * | 1/2001  | Kutschi ......................... 267/107 |
| 6,353,953 | B1 | * | 3/2002  | Tanaka et al. ..................... 5/723 |
| 6,427,990 | B1 | * | 8/2002  | Hartmann ..................... 267/158 |
| 6,477,727 | B1 | * | 11/2002 | Fromme ........................... 5/247 |
| 2007/0246873 | A1 | * | 10/2007 | VanDeRiet et al. ........... 267/142 |

FOREIGN PATENT DOCUMENTS

| EP | 1602303 A2 | * | 12/2005 |
| EP | 1649786 A1 | *  | 4/2006 |

* cited by examiner

*Primary Examiner* — Bradley T King
(74) *Attorney, Agent, or Firm* — Hedman & Costigan, P.C.; James V. Costigan

(57) ABSTRACT

Springing construction for making mattresses where a plurality of resilient modular elements having a central coupling body for coupling to locating bars are extended substantially parallel to the lying plane of the mattress and the central coupling body is associated with a central springing element that adjoins, on opposite sides of the locating bars lying plane, springing side elements, and the modular elements are resiliently yieldable along a direction that is substantially perpendicular to the mattress lying plane.

3 Claims, 12 Drawing Sheets

SPRINGING CONSTRUCTION FOR MAKING MATTRESSES AND THE LIKE

BACKGROUND OF THE INVENTION

The present invention relates to a springing or suspension construction for making mattresses and the like.

As is known, springing or suspension constructions conventionally used for making paddings and mattresses are usually made starting from spring elements which, in their most evolved patterns, provide to use independent bagged-in springs, made of a metal material, and, in particular, of a piano steel and the like.

Such a pattern allows to provide an anatomically proper lying for a user, even from a moisture standpoint, since, because of a bellow sort of effect, a good air exchange is achieved.

However, the above mentioned approach has the drawback that the inner structure of the springs is made of a steel material, thereby providing an electromagnetic wave receiving and reflecting mass, affected by a comparatively high amount of electromagnetical waves generated by TV sets cellular phones, computers, telecontrol devices, high voltage apparatus, radars, artificial satellites and so on, as well as other electric apparatus.

In such a condition, the human body, in particular during a rest period thereof, is immersed in an environment which is objectable from a health standpoint.

SUMMARY OF THE INVENTION

Accordingly, the aim of the present invention is to overcome the above mentioned problem, by providing a springing or suspension construction, in particular for making mattresses and the like, allowing to nearly fully eliminate any metal element, thereby overcoming the above mentioned negative effects related to the electromagnetic wave reception and reflection.

Within the scope of the above mentioned aim, a main object of the invention is to provide such a springing or suspension construction, specifically designed for making mattresses and the like, which allows to use an independent springing at several regions of the mattress, while preserving all the positive features of the bagged-in spring elements, without having their drawbacks.

Another object of the present invention is to provide such a springing or suspension construction which, owing to its peculiar designing features, is very reliable and safe in operation.

Yet another object of the present invention is to provide such a springing construction, for making mattresses and the like, which can be easily made and which, moreover, is very competitive from a mere economic standpoint.

According to one aspect of the present invention, the above mentioned aim and objects, as well as yet other objects, which will become more apparent hereinafter, are achieved by a springing construction for making mattresses and the like, characterized in that said springing construction comprises a plurality of resilient modular elements, having a central coupling body for coupling to locating bars which extends substantially parallel to a mattress lying plane, said central body being associated with a central springing element adjoining, on opposite sides of the locating bars lying plane, springing side elements, said modular elements being resiliently yieldable along a direction substantially perpendicular to the mattress lying plane.

BRIEF DESCRIPTION OF THE DRAWINGS

Further characteristics and advantages of the present invention will become more apparent hereinafter from the following detailed disclosure of a preferred, though not exclusive, embodiment of a springing construction, specifically designed for making mattresses and the like, which is illustrated, by way of an indicative, but not limitative, example in the accompanying drawings, where.

DESCRIPTION OF THE PREFERRED EMBODIMENTS

With reference to the number references of the above mentioned figures, the springing or suspension construction, specifically designed for making mattresses and the like, which has been generally indicated by the reference number 1, comprises a plurality of resilient or resiliently yieldable or yielding modular elements 2, which are made of a plastics material and, in particular, of a resilient plastics material such as polyurethane, hytrel and the like.

Figure 1:
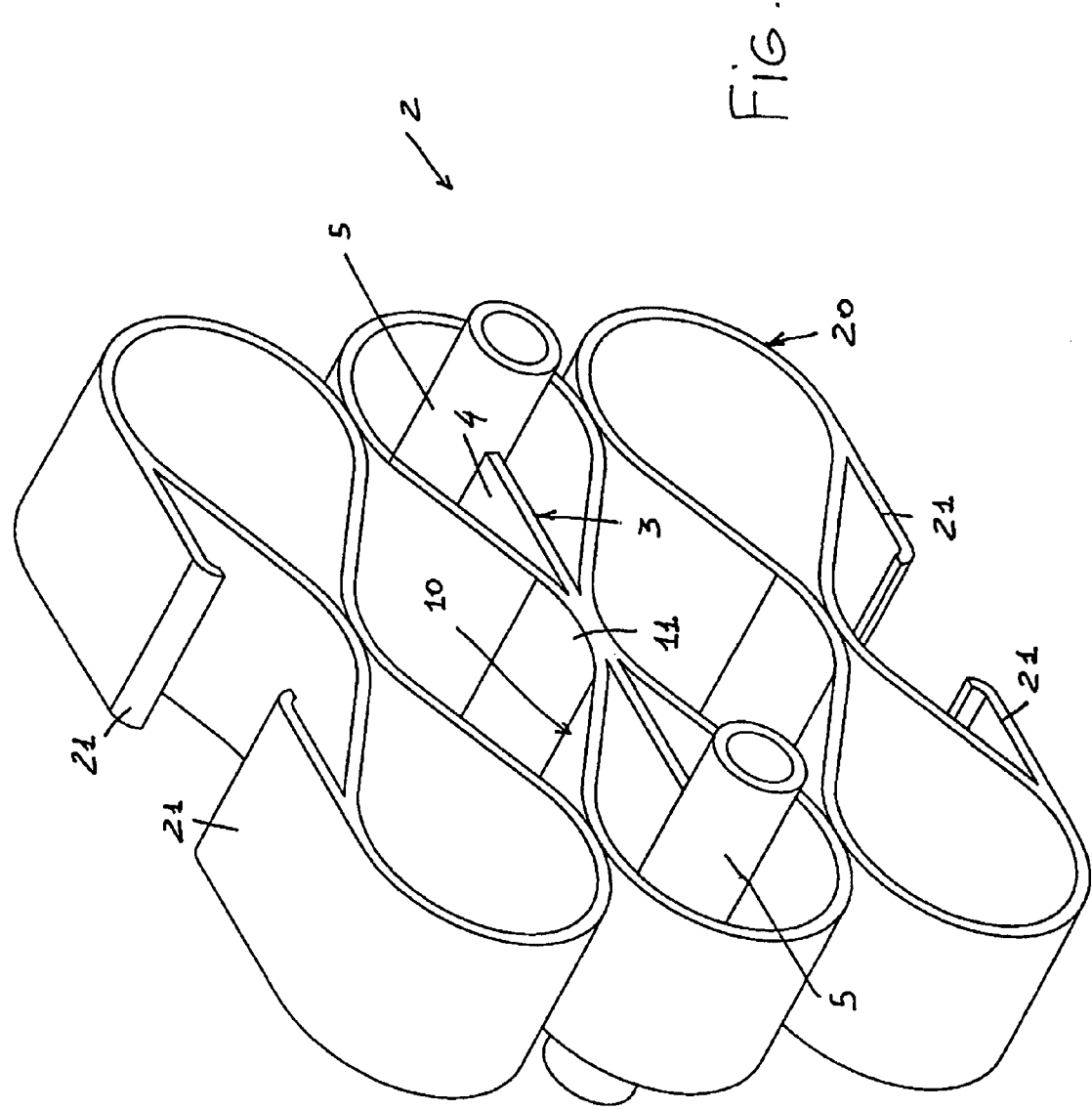
FIG. 1 is a schematic perspective view showing a resiliently yieldable or yielding modular element.
Figure 2:
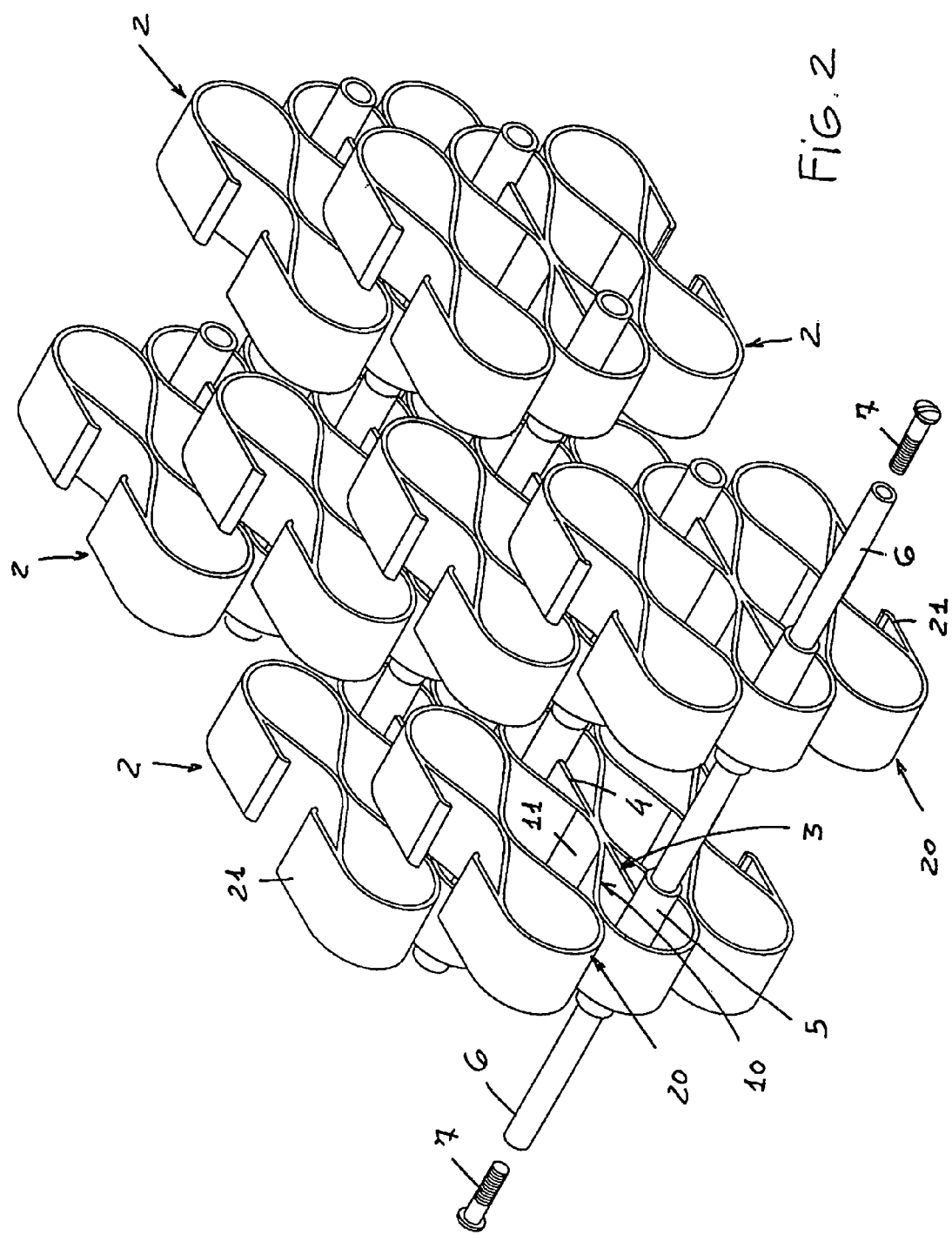
FIG. 2 is a further schematic perspective view showing a plurality of modular elements as assembled with one another.
Figure 3:
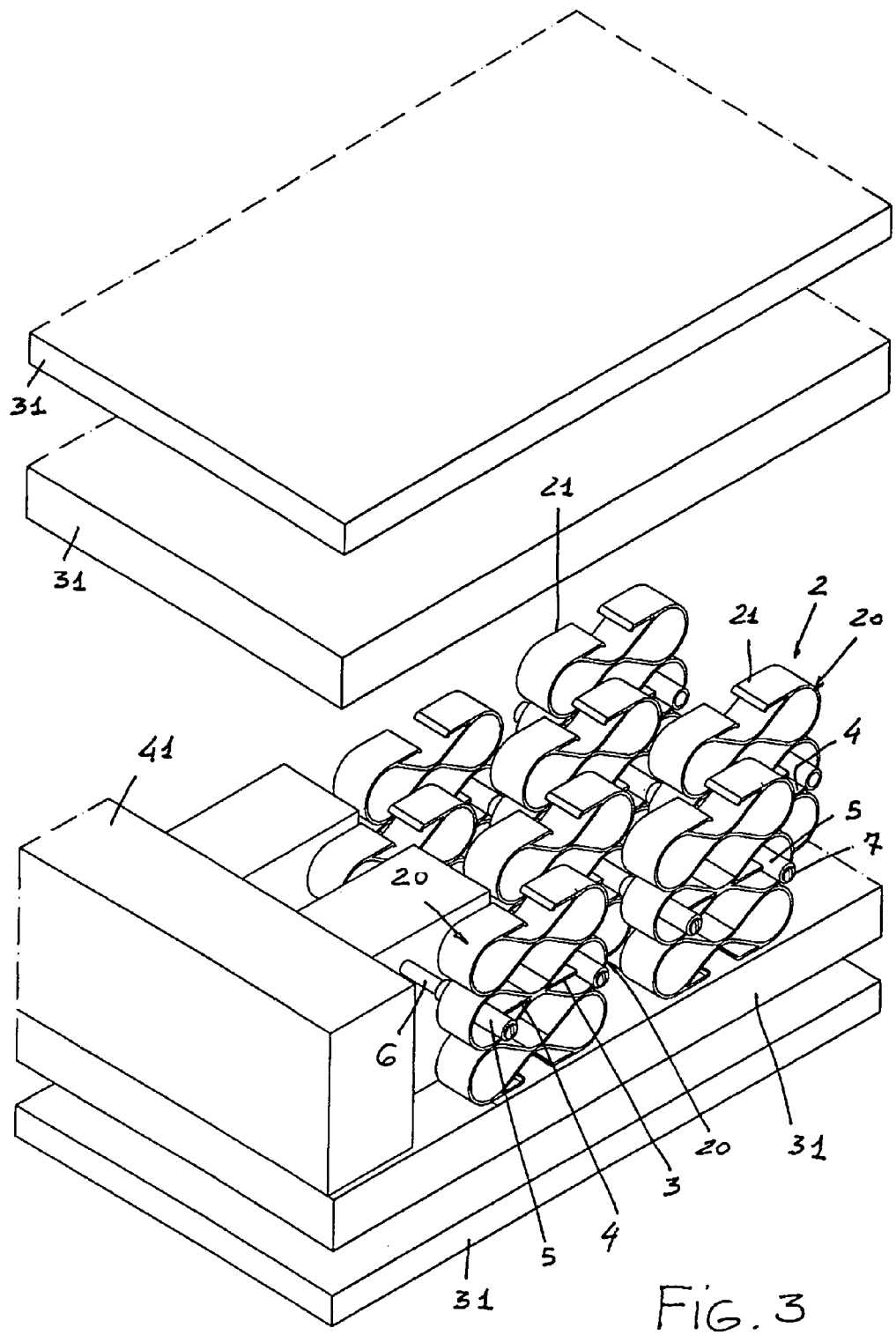
FIG. 3 is a further exploded perspective view showing a detail of a mattress.
Figure 4:
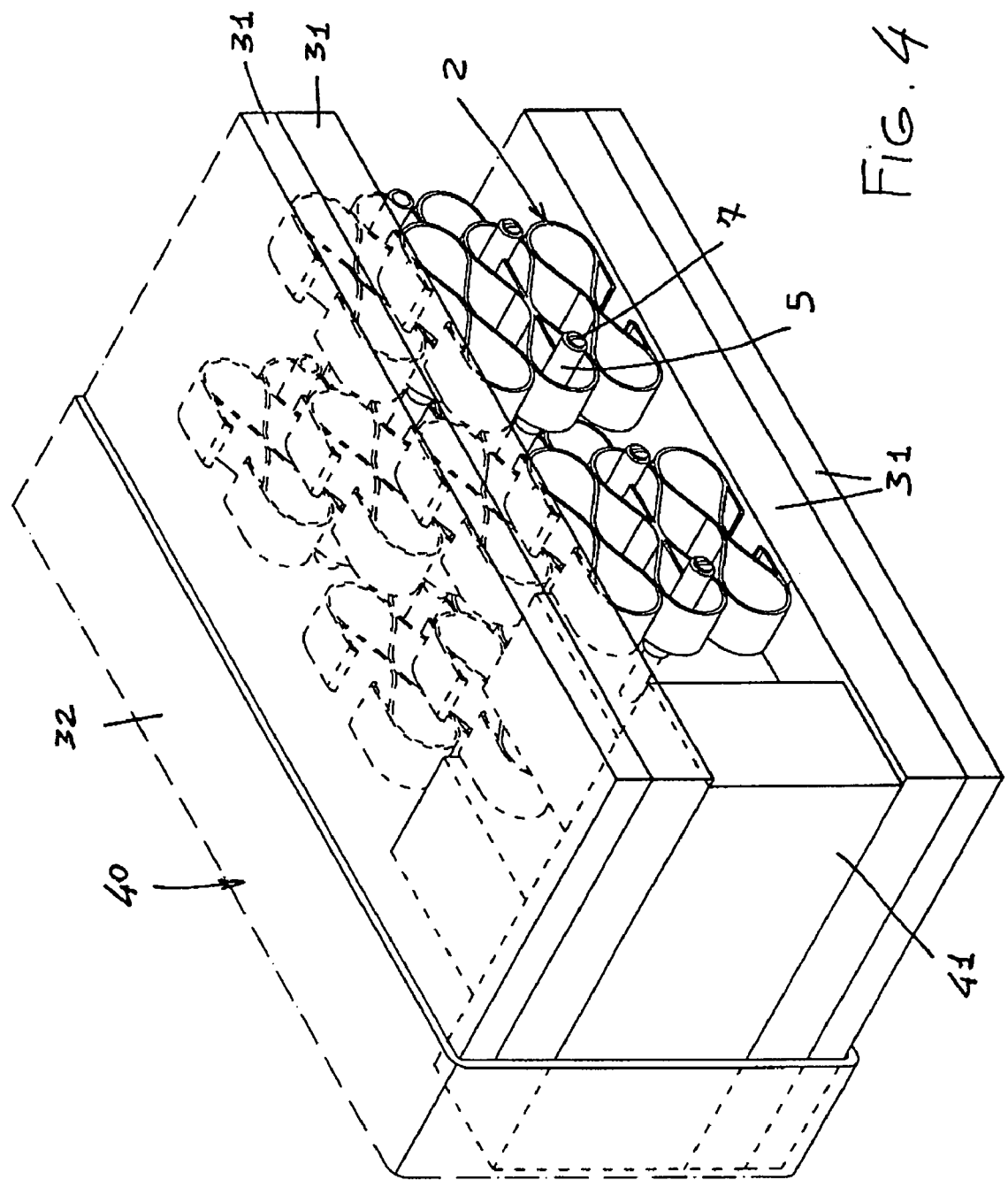
FIG. 4 is a further perspective, partially broken away view, showing a detail of a mattress.
Figure 5:
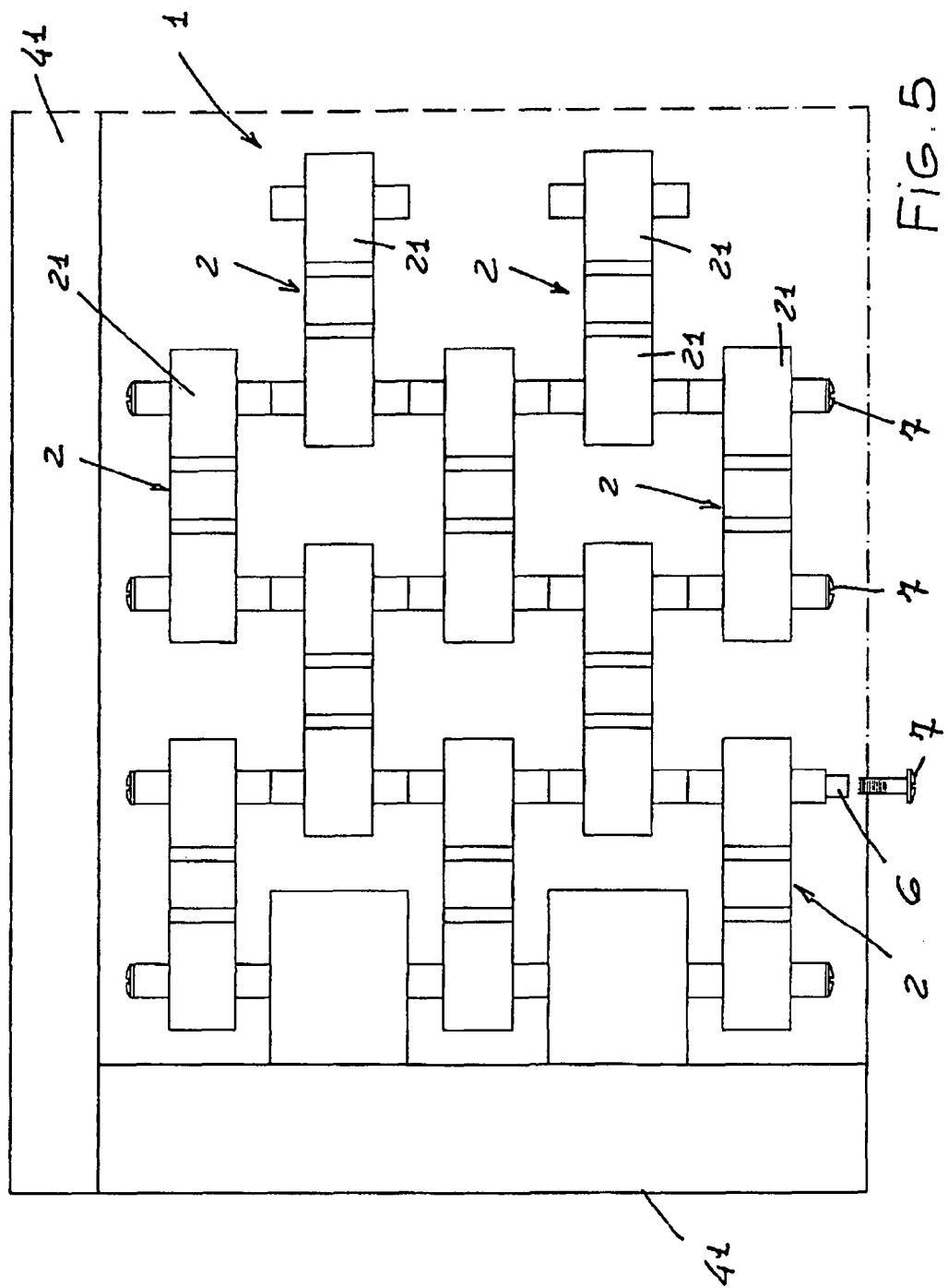
FIG. 5 is a schematic top plan view showing the subject mattress.
Figure 6:
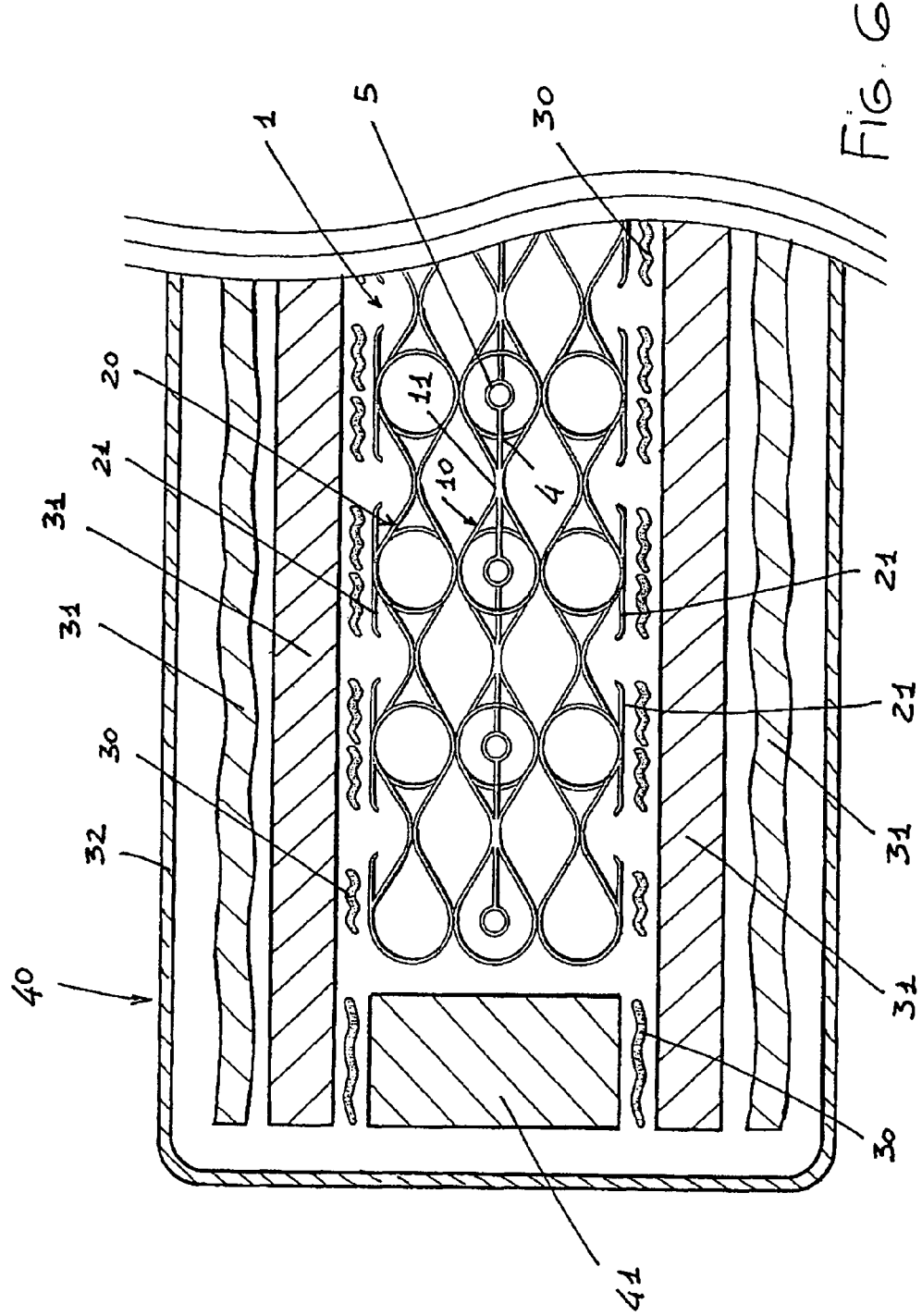
FIG. 6 shows the subject mattress, as cross-sectioned along a longitudinal plane perpendicular to the mattress lying plane.

Each said modular element 2, as shown in FIG. 1, has a central coupling body 3, made of a central sheet element 4 ending with a pair of projecting sleeve elements 5, thereby operating as a spacer.

Said sleeve elements 5, in particular, are designed to receive therein locating bars 6, lying in a plane parallel to the mattress lying plane and being arranged substantially transversally of the longitudinal extension of the mattress.

Said bars 6, having end plug elements 7, are threaded into the sleeve elements 5, thereby allowing the resilient modular elements to be coupled so as to practically provide a quincuncial pattern.

To said central body 3 is coupled a central springing element 10 which, advantageously, is patterned as an elongated eight element, with the central portion 11 rigid with the sheet element and with closed portions encompassing the sleeve members 5 thereby being spaced from the latter.

A plurality of springing side elements, generally indicated by the reference number 20, are arranged in an adjoining relationship with the central springing element, said side springing elements also having an elongated-8 pattern, and being arranged on opposite sides of the plane defined by the coupling bars 6.

More specifically, said side springing elements have flat portions 21, on their outer parts, defining a broad glueing flat zone, for glueing, by a glue layer 30, conventional padding and coating layers, which have been generally indicated in the drawings by the reference number 31, and are made for completing the mattress inside the closure sheath 32 thereof.

At the perimetrical regions of the mattress 40 are moreover provided perimetrical blocks 41, made of a foamed plastics material, such as foamed polyurethane, latex foam and the like, defining the mattress contour and providing a finishing pattern for the springing construction housing region.

FIGS. 7 to 14 show further embodiments of the invention, in which the subject springing construction comprises a plurality of resilient modular elements 102 having a modified pattern from the modular elements 2 as thereinabove disclosed, but still made of a plastics material and, in particular, of a resilient thermoplastics material such as polyurethane, hytrel and the like.

Figure 7:
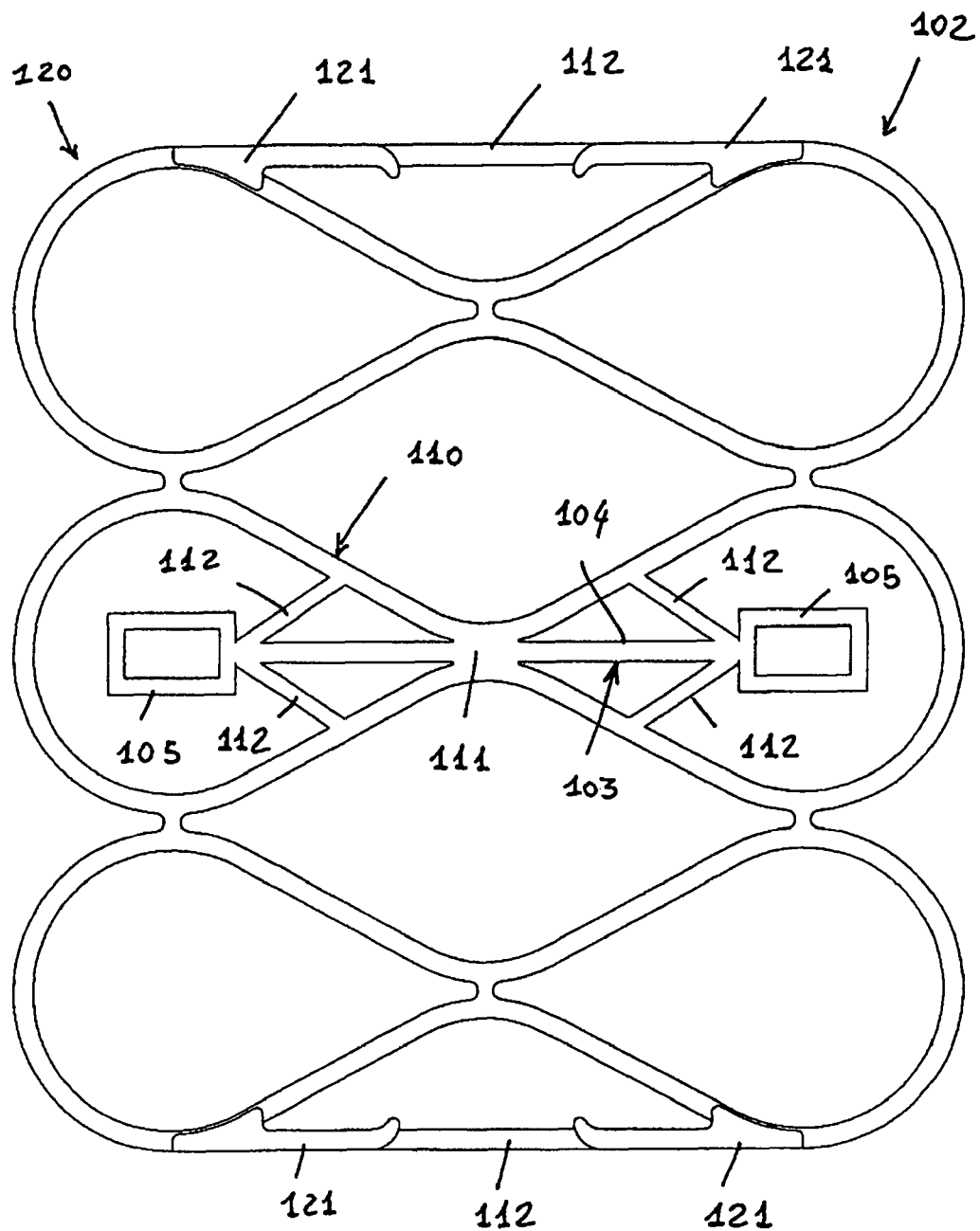
FIG. 7 is an elevation view showing a resiliently yielding resilient modular element according to a further aspect of the invention, having sleeve elements including a quadrangular cross-section.

As shown in FIG. 7, each said modular element 102 comprises a central coupling body 103, constituted by a central sheet element 104 ending with a pair of sleeve elements 105 having a quadrangular cross-section and substantially the same width as the modular element body.

Locating bars 106 are housed in said sleeve elements 105, said locating bars lying in a plane which is substantially parallel to the mattress lying plane and being arranged substantially transversely of the longitudinal extension of the mattress.

Figure 8:
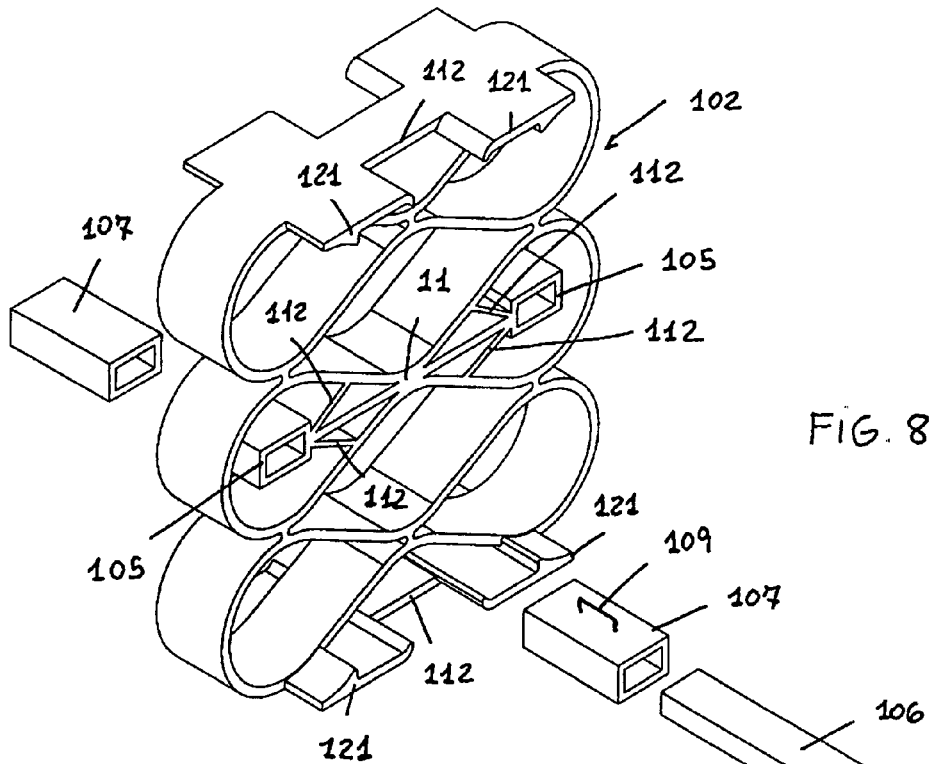
FIG. 8 is yet another exploded perspective view showing the resiliently yieldable or yielding modular element of FIG. 7, and a locating bar with a spot fixation system.
Figure 9:
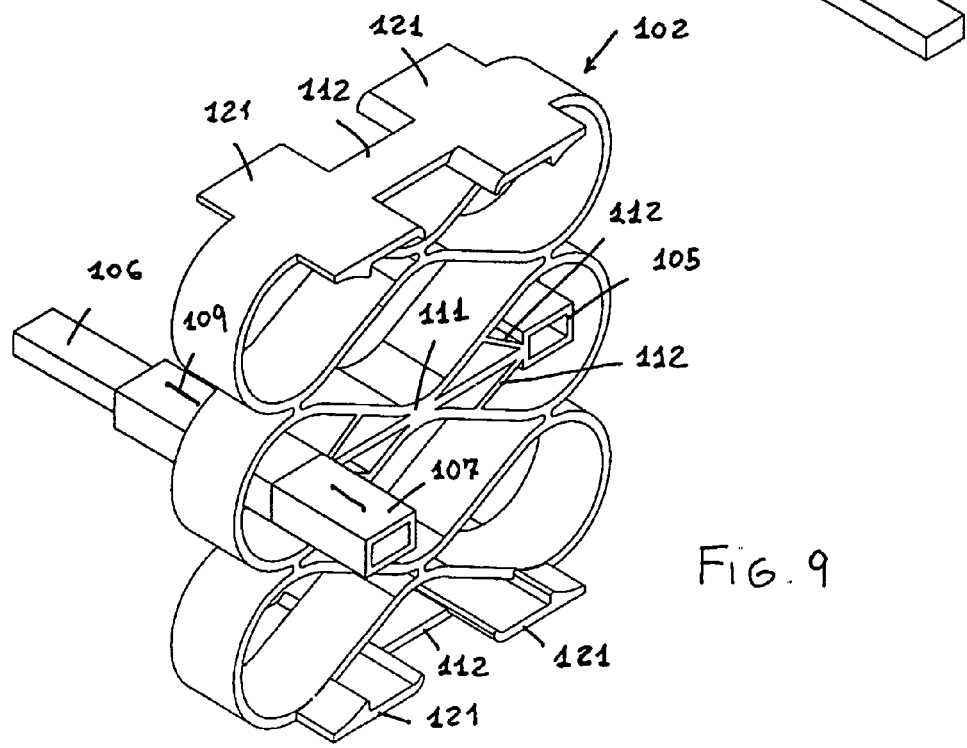
FIG. 9 is a view similar to FIG. 8, but showing the locating bar associated with the resilient modular element.

In the embodiment shown in FIGS. 8 and 9, said locating bars 106 are engaged in said sleeve elements 105 through an interposition of quadrangular bushings 107, having a cross section which is substantially equal to the sleeve element cross section, and being used for applying attachment or fixing-clamping means for said locating bars, preferably comprising a plurality of fixing spots 109 or other suitable fixing elements.

Figure 10:
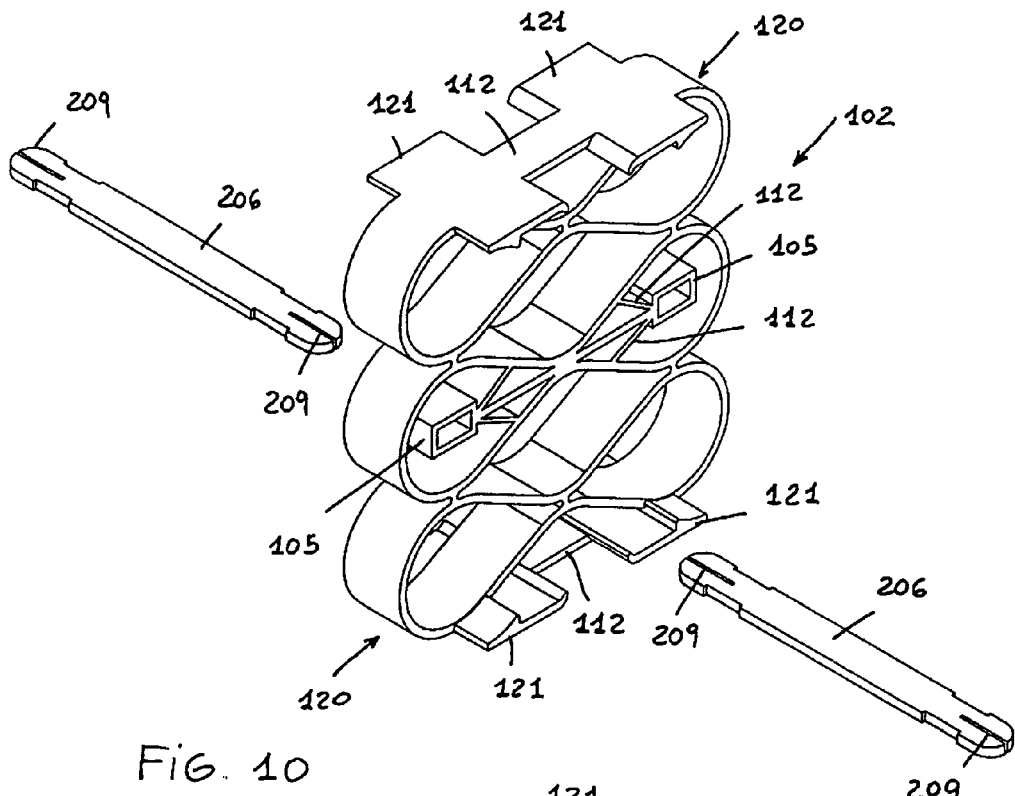
FIG. 10 is a further exploded perspective view showing the resilient modular element of FIG. 9 and a locating bar with a fixed-joint type or of attachment system.
Figure 11:
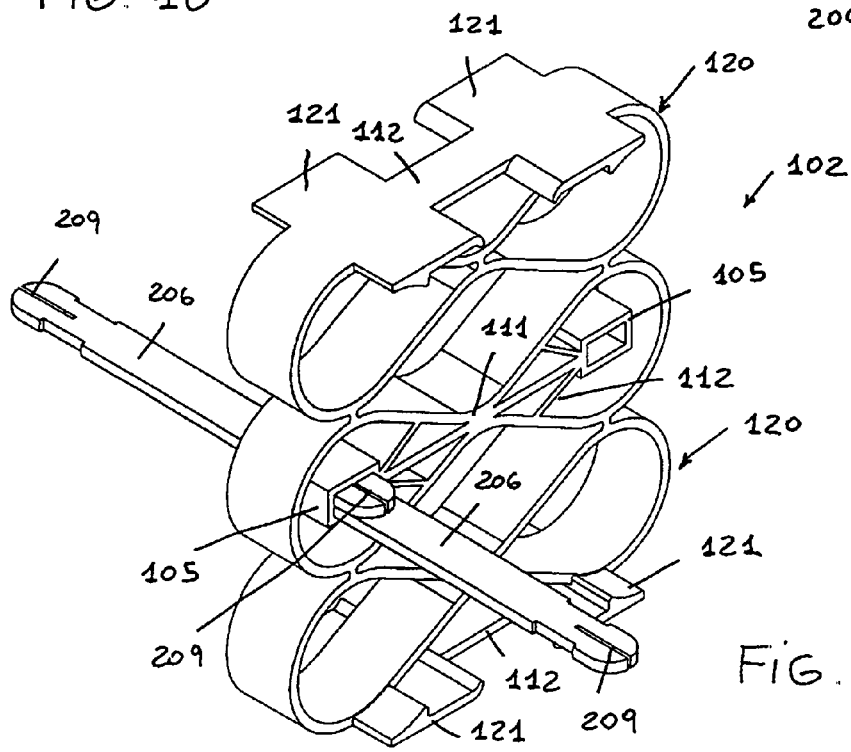
FIG. 11 is a schematic view similar to FIG. 10, but showing the locating bar associated with the resilient modular element.
Figure 12:
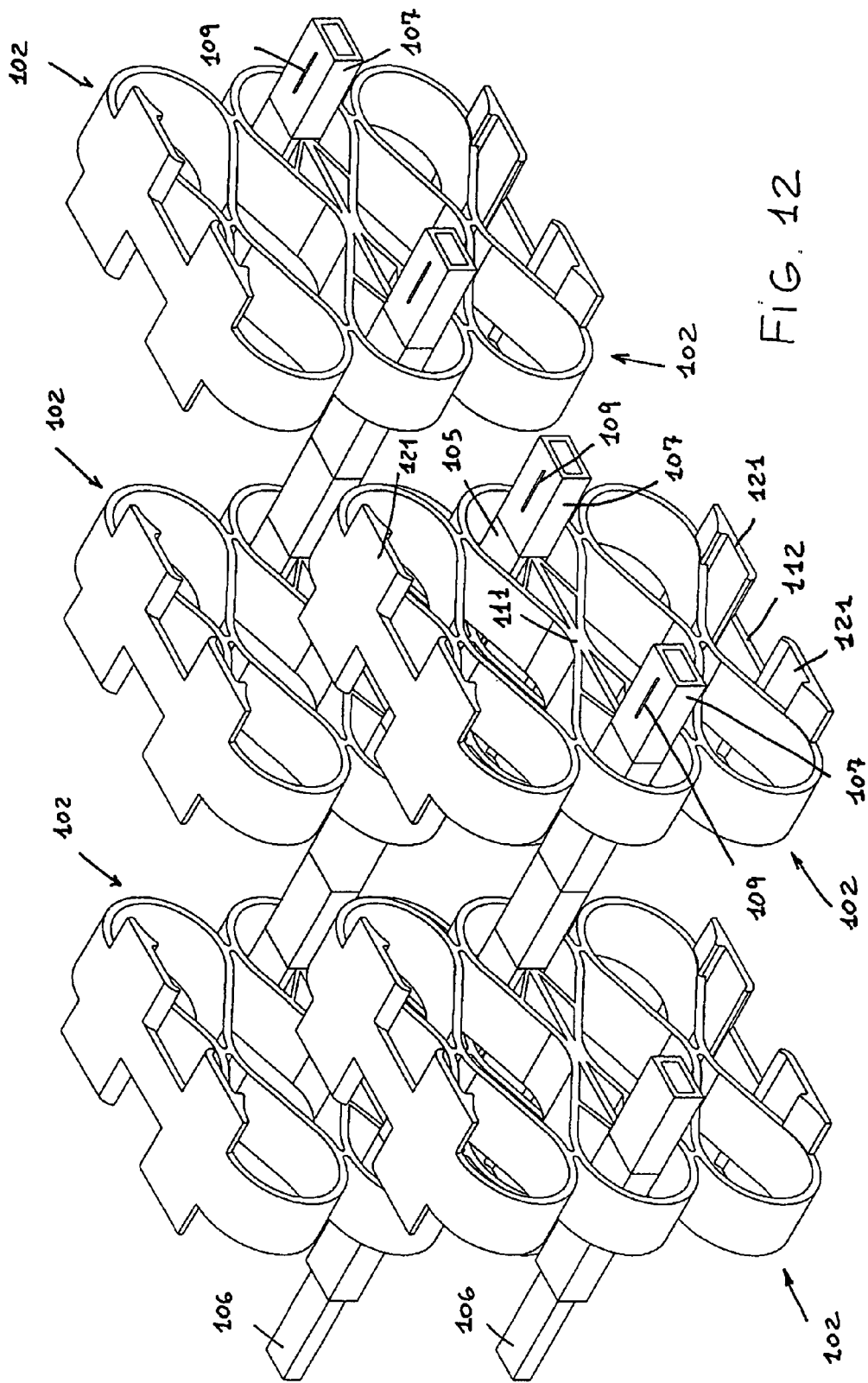
FIG. 12 is a further schematic perspective view showing a plurality of modular elements of the type shown in FIG. 7, and assembled with one another.
Figure 13:
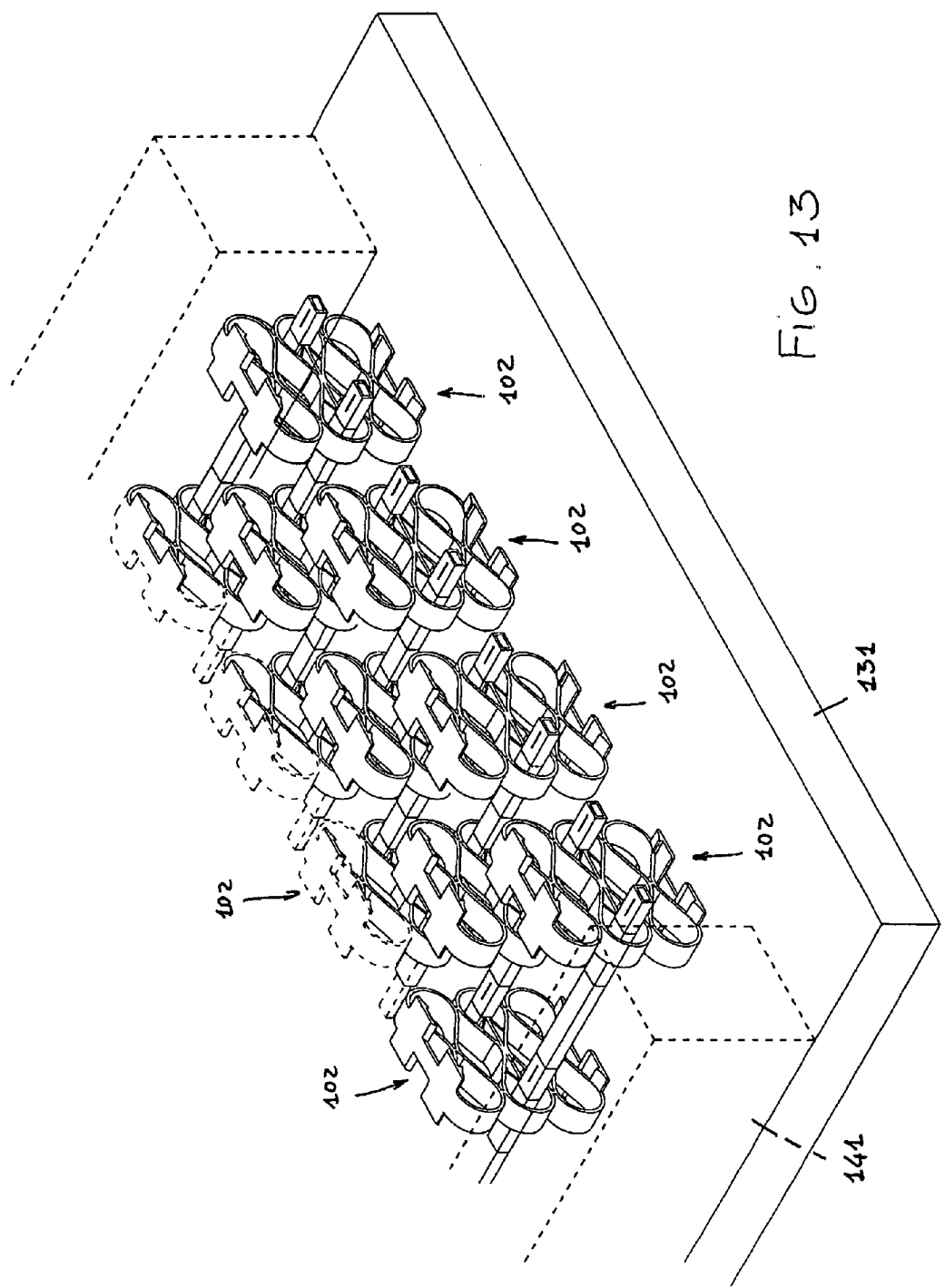
FIG. 13 is a further exploded perspective view showing a detail of a mattress including a plurality of modular elements of the type shown in FIG. 7.
Figure 14:
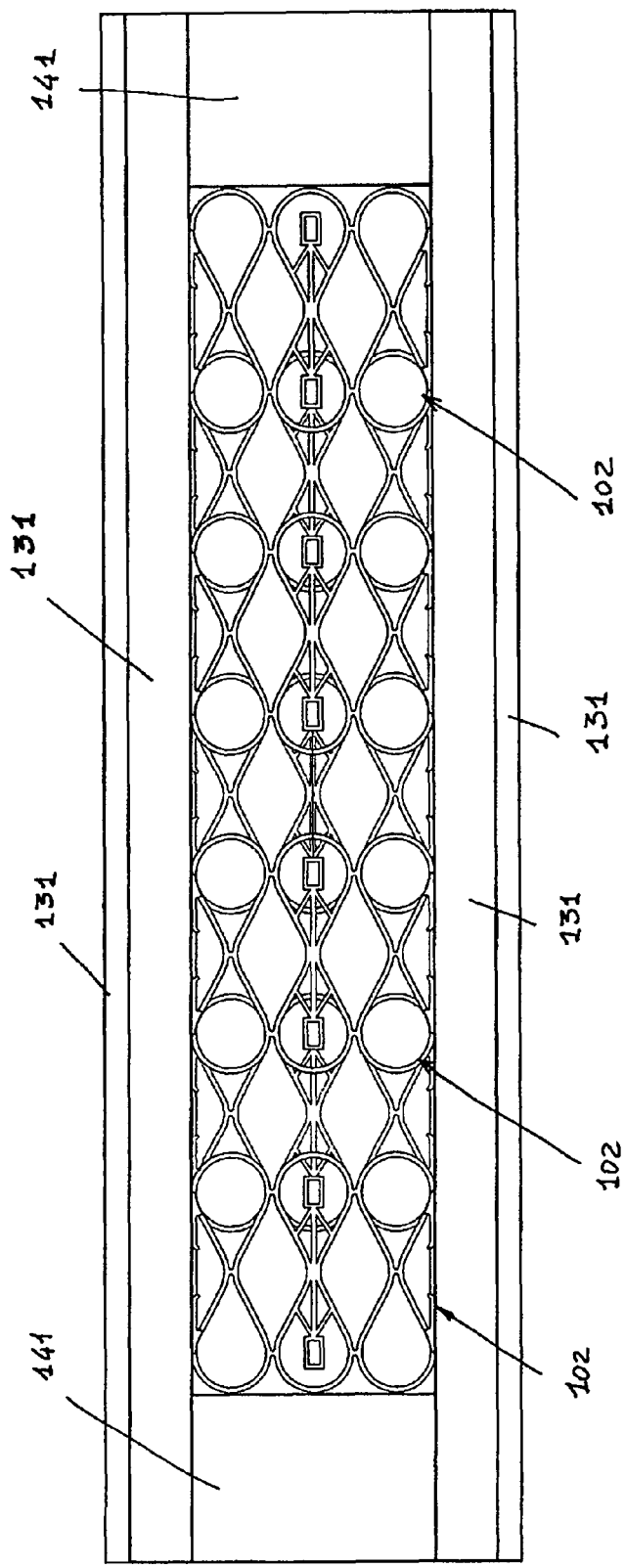
FIG. 14 shows the mattress of FIG. 13, as cross-sectioned along a longitudinal cross-section plane perpendicular to the lying plane of the mattress.

According to a further embodiment, shown in FIGS. 10 and 11, the connection system for coupling the modular elements comprises connection small rods 206 having a cross-section which substantially corresponds to a half of the sleeve element 105 cross section, thereby allowing the end portions of two rods 206 to be easily engaged in said sleeve elements.

In particular, said rods 206 have enlarged end portions 209 which can be resiliently deformed through a notch, thereby allowing the engaging of said rods into said sleeve elements 105, while preventing the rods from being disengaged or unthreaded from the latter.

The modular element 102 comprises moreover a central springing element 110, coupled to the central body 103 and which has advantageously an elongated-8 pattern, with the central portion 111 being integral or rigid with the sheet element 104 and with closed portions encompassing the sleeve elements 105, while being properly spaced therefrom.

The sleeve elements 105 are moreover connected to the central springing element 110 by stabilizing buttress elements 112.

Adjoining the central springing element are provided side springing elements, indicated by the reference number 120, which also have an elongated-8 pattern and are arranged on opposite sides of the plane defined by the connecting rods or bars 106.

Said side springing elements, in particular, have flat portions 121, on their outer walls, allowing to define a broad flat region for glueing conventional padding and coating layers, made for finishing the mattress inside the closure sheath or lining thereof.

As shown, the flat portions 121 are advantageously coupled by a reinforcing lug 112.

The mattress, generally indicated by the reference number 140, comprises, as in the above disclosed embodiment thereof, conventional padding and coating layers, generally indicated by the reference number 131 and made for finishing the mattress inside the closure lining thereof.

At the perimetrical regions of the mattress 140 are moreover provided perimetrical blocks 141, made of a foamed plastic material, such as foamed polyurethane, latex foam and the like, defining the mattress contour and providing a proper finishing of the springing construction housing region.

By the above disclosed device it is possible to provide a very efficient springing or suspension construction, which can be assembled in a very quick manner and which does not use metal elements, and, moreover, is adapted to anatomically support a human body.

From the above disclosure it should be apparent that the invention fully achieves the intended aim and objects.

In particular, the fact is to be pointed out that the invention as provided has springing construction based on the use of a modular element which can be easily made, and which is very efficient from an operating standpoint and can be furthermore assembled in a very quick manner.

The invention, as disclosed, is susceptible to several modifications and variations, all coming within the scope of the invention.

Moreover, all the constructional details can be replaced by other technically equivalent elements.

The invention claimed is:

1. A springing construction for making mattresses, said springing construction comprising a plurality of resilient modular elements, having a central coupling body for coupling to locating bars which extend substantially parallel to a mattress lying plane, said central body being associated with a central springing element adjoining, on opposite sides of the locating bar lying plane, springing side elements, said modular elements being resiliently yieldable along a direction substantially perpendicular to the mattress lying plane, said modular elements being made as single bodies of a plastic material, said central body comprising a sheet portion coupled, at the ends thereof, to coupling sleeves for connection with said locating bars, said coupling sleeves projecting on opposite faces of said modular element to operate as a spacer member, said locating bars comprising tubular elementS closed by respective end plugs, characterized in that said central springing element has an elongated-8 pattern, with a central portion thereof rigid with said sheet element, said side springing elements having an elongated-8 pattern and being associated with said central springing element at closed loop portions, said side springing elements having, at their outer faces, flat portions for applying a glue material for connecting coating layers.

2. A springing construction, according to claim 1, said modular elements being arranged with an offset quincuncial arrangement, said sleeve elements having a quadrangular cross-section having substantially a same width of a body of said modular element, said locating bars being engaged in said sleeve elements through an interposition of quadrangular bush elements, having a cross-section substantially equal to that of said sleeve elements and being suitable for applying clamping means for clamping said locating bars, characterized in that said modular elements are coupled by coupling bars having a cross-section which corresponds substantially to a half of a cross-section of said quadrangular sleeve elements, said coupling bars having enlarged end portions and a notch allowing said enlarged end portions to be deformed to facilitate an engagement of said enlarged end portions in said sleeve elements while preventing said enlarged end portions from disengaging from said sleeve elements.

3. A springing construction, according to claim 2, characterized in that said sleeve elements are coupled to said central springing elements by a plurality of stabilizing buttress coupling elements.

* * * * *